United States Patent
Vangal-Ramamurthy et al.

(10) Patent No.: US 9,996,071 B2
(45) Date of Patent: Jun. 12, 2018

(54) MOVEABLE SLIDER FOR USE IN A DEVICE ASSEMBLY PROCESS

(71) Applicant: Western Digital Technologies, Inc., Irvine, CA (US)

(72) Inventors: Jambunathan Vangal-Ramamurthy, San Jose, CA (US); Kam Fung Yan, Cupertino, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 475 days.

(21) Appl. No.: 14/314,012

(22) Filed: Jun. 24, 2014

(65) Prior Publication Data

US 2015/0370238 A1    Dec. 24, 2015

(51) Int. Cl.
*G05B 19/402* (2006.01)

(52) U.S. Cl.
CPC .. *G05B 19/402* (2013.01); *G05B 2219/49001* (2013.01)

(58) Field of Classification Search
CPC ................ G05B 19/402; G05B 2219/49001
USPC ..................................................... 700/114
See application file for complete search history.

(56) References Cited

U.S. PATENT DOCUMENTS

| | | | | |
|---|---|---|---|---|
| 3,768,094 A | * | 10/1973 | Henrich | G01D 5/2013 235/449 |
| 3,820,110 A | * | 6/1974 | Henrich | G01D 5/2013 235/450 |
| 5,606,256 A | * | 2/1997 | Takei | A47G 1/0616 310/12.19 |
| 5,703,417 A | * | 12/1997 | Kelly | H02K 41/031 310/12.21 |
| 5,760,500 A | * | 6/1998 | Kondo | H02K 41/02 248/913 |
| 6,028,376 A | * | 2/2000 | Osanai | G03F 7/70716 310/12.13 |
| 6,049,973 A | | 4/2000 | Frank, Jr. et al. | |

(Continued)

FOREIGN PATENT DOCUMENTS

| | | | | |
|---|---|---|---|---|
| JP | 407299675 | * | 11/1995 | ............ B23P 19/06 |
| JP | 8236487 | * | 9/1996 | ........... H01L 21/304 |
| WO | WO2009/130645 | * | 10/2009 | |

OTHER PUBLICATIONS

Design World Staff, "Two Axis Linear Stepper Motor Gantry Stage", Apr. 8, 2009, pp. 1.*

(Continued)

*Primary Examiner* — Miranda Huang
*Assistant Examiner* — Olvin Lopez Alvarez
(74) *Attorney, Agent, or Firm* — Foley & Lardner LLP

(57) ABSTRACT

A system for use in a device assembly process to aid in performing at least one device assembly operation is disclosed. The system may comprise: a moveable slider moveably coupled to a slider base to move components of the device in the assembly process; and an electronics module coupled to an end portion of the slider base. The electronics module may comprise: a driver to provide driver output to the moveable slider; and a controller that includes the driver to transmit control signals through the driver to control movement of the moveable slider. The moveable slider may move components of the device in the assembly process in which at least one device assembly operation is performed.

14 Claims, 4 Drawing Sheets

(56) References Cited

U.S. PATENT DOCUMENTS

| | | | |
|---|---|---|---|
| 6,467,153 B2 | 10/2002 | Butts et al. | |
| 6,651,192 B1 | 11/2003 | Viglione et al. | |
| 6,657,801 B1 | 12/2003 | Chue et al. | |
| 6,671,637 B2 * | 12/2003 | Shinohira | G01R 31/34 318/561 |
| 6,687,093 B1 | 2/2004 | Butler et al. | |
| 6,751,041 B1 | 6/2004 | Codilian et al. | |
| 6,788,480 B1 | 9/2004 | Codilian et al. | |
| 6,791,782 B1 | 9/2004 | Codilian et al. | |
| 6,792,669 B2 | 9/2004 | Codilian | |
| 6,798,592 B1 | 9/2004 | Codilian et al. | |
| 6,859,996 B1 * | 3/2005 | Slife | G11B 5/4813 29/603.03 |
| 6,873,404 B2 * | 3/2005 | Korenaga | G03F 7/70716 310/12.01 |
| 6,894,861 B1 | 5/2005 | Codilian et al. | |
| 6,897,393 B1 | 5/2005 | Codilian et al. | |
| 6,898,044 B1 | 5/2005 | Chheda | |
| 6,943,972 B1 | 9/2005 | Chue et al. | |
| 7,003,626 B1 | 2/2006 | Chheda et al. | |
| 7,027,242 B1 | 4/2006 | Terrill et al. | |
| 7,046,467 B1 | 5/2006 | Chheda | |
| 7,058,759 B1 | 6/2006 | Reiser et al. | |
| 7,072,129 B1 | 7/2006 | Cullen et al. | |
| 7,076,391 B1 | 7/2006 | Pakzad et al. | |
| 7,076,603 B1 | 7/2006 | Chheda | |
| 7,136,242 B1 | 11/2006 | Chue et al. | |
| 7,139,145 B1 | 11/2006 | Archibald et al. | |
| 7,145,744 B1 | 12/2006 | Clawson et al. | |
| 7,178,432 B1 | 2/2007 | Han et al. | |
| 7,199,959 B1 | 4/2007 | Bryant | |
| 7,203,020 B1 | 4/2007 | Viglione et al. | |
| 7,209,310 B1 | 4/2007 | Tsai et al. | |
| 7,222,410 B1 | 5/2007 | Klassen et al. | |
| 7,236,911 B1 | 6/2007 | Gough et al. | |
| 7,269,525 B1 | 9/2007 | Gough et al. | |
| 7,458,282 B1 | 12/2008 | Wuester, Sr. et al. | |
| 7,490,398 B1 | 2/2009 | Klassen et al. | |
| 7,506,553 B1 | 3/2009 | Panyavoravaj | |
| 7,549,204 B1 | 6/2009 | Vangal-Ramamurthy et al. | |
| 7,552,526 B1 | 6/2009 | Klassen et al. | |
| 7,559,590 B1 | 7/2009 | Jones | |
| 7,561,416 B1 | 7/2009 | Sarraf | |
| 7,596,722 B1 | 9/2009 | Pakzad et al. | |
| 7,634,375 B1 | 12/2009 | Pakzad et al. | |
| 7,653,983 B1 | 2/2010 | Klassen | |
| 7,669,711 B1 | 3/2010 | Westwood | |
| 7,671,599 B1 | 3/2010 | Tan et al. | |
| 7,673,638 B1 | 3/2010 | Boynton et al. | |
| 7,690,705 B1 | 4/2010 | Roberts et al. | |
| 7,743,486 B1 | 6/2010 | Klassen et al. | |
| 7,863,889 B1 | 1/2011 | Bamrungtham | |
| 7,869,182 B1 | 1/2011 | Tan et al. | |
| 7,869,183 B1 | 1/2011 | Tan et al. | |
| 7,874,424 B1 | 1/2011 | Westwood | |
| 7,896,218 B2 | 3/2011 | Rakpongsiri et al. | |
| 7,900,272 B1 | 3/2011 | Tan et al. | |
| 7,912,666 B1 | 3/2011 | Pakzad et al. | |
| 7,916,599 B1 | 3/2011 | Panyavoravaj et al. | |
| 7,921,543 B2 | 4/2011 | Trongjitwikrai et al. | |
| 7,940,487 B1 | 5/2011 | Krishnan et al. | |
| 7,974,038 B2 | 7/2011 | Krishnan et al. | |
| 7,980,159 B1 | 7/2011 | Han | |
| 7,987,585 B1 | 8/2011 | Klassen et al. | |
| 8,066,171 B1 | 11/2011 | Rakpongsiri et al. | |
| 8,078,421 B1 | 12/2011 | Shastry et al. | |
| 8,092,610 B1 | 1/2012 | Tarrant | |
| 8,094,414 B1 | 1/2012 | Cheng et al. | |
| 8,098,460 B1 | 1/2012 | Jen et al. | |
| 8,127,643 B1 | 3/2012 | Tan | |
| 8,135,208 B1 | 3/2012 | Vangal-Ramamurthy | |
| 8,162,366 B1 | 4/2012 | Tan et al. | |
| 8,168,033 B1 | 5/2012 | Mohamad Nor | |
| 8,180,487 B1 | 5/2012 | Vangal-Ramamurthy et al. | |
| 8,199,425 B1 | 6/2012 | Gustafson et al. | |
| 8,218,256 B1 | 7/2012 | Lin et al. | |
| 8,223,448 B1 | 7/2012 | Haw et al. | |
| 8,230,570 B1 | 7/2012 | Choong | |
| 8,245,601 B1 | 8/2012 | Hastama et al. | |
| 8,267,831 B1 | 9/2012 | Olsen et al. | |
| 8,270,118 B1 | 9/2012 | Cheng et al. | |
| 8,300,338 B1 | 10/2012 | McFadyen | |
| 8,307,537 B1 | 11/2012 | Klassen et al. | |
| 8,312,585 B1 | 11/2012 | Tarrant | |
| 8,322,235 B1 | 12/2012 | Keopuang et al. | |
| 8,327,529 B1 | 12/2012 | Tan et al. | |
| 8,335,049 B1 | 12/2012 | Liu et al. | |
| 8,345,367 B1 | 1/2013 | Tharumalingam | |
| 8,356,384 B1 | 1/2013 | Ferre et al. | |
| 8,363,881 B2 * | 1/2013 | Godkin | H04R 9/00 381/400 |
| 8,369,073 B2 | 2/2013 | Trinh et al. | |
| 8,379,363 B1 | 2/2013 | Kolunthavelu et al. | |
| 8,387,631 B1 | 3/2013 | Thonghara et al. | |
| 8,424,418 B1 | 4/2013 | Wuester, Sr. et al. | |
| 8,424,824 B1 | 4/2013 | Tan et al. | |
| 8,432,630 B1 | 4/2013 | Lin et al. | |
| 8,432,631 B1 | 4/2013 | Lin et al. | |
| 8,447,430 B1 | 5/2013 | Tan et al. | |
| 8,447,551 B1 | 5/2013 | Ong et al. | |
| 8,451,578 B1 | 5/2013 | Tan et al. | |
| 8,453,841 B1 | 6/2013 | James et al. | |
| 8,454,755 B1 | 6/2013 | Tan et al. | |
| 8,485,772 B1 | 7/2013 | Ismail et al. | |
| 8,493,681 B1 | 7/2013 | Selvaraj | |
| 8,537,480 B1 | 9/2013 | Haw | |
| 8,544,164 B1 | 10/2013 | Cheng et al. | |
| 8,547,657 B1 | 10/2013 | Liu et al. | |
| 8,553,968 B1 | 10/2013 | Lee et al. | |
| 8,561,285 B1 | 10/2013 | Vangal-Ramamurthy et al. | |
| 8,565,511 B1 | 10/2013 | Sungkhaphong et al. | |
| 8,582,229 B1 | 11/2013 | Krishnan | |
| 8,596,107 B1 | 12/2013 | Wongdao et al. | |
| 8,605,383 B1 | 12/2013 | Wang et al. | |
| 8,640,328 B1 | 2/2014 | Yow et al. | |
| 8,650,716 B1 | 2/2014 | Methe et al. | |
| 8,653,824 B1 | 2/2014 | Liu et al. | |
| 8,662,554 B1 | 3/2014 | Srisupun et al. | |
| 8,683,676 B1 | 4/2014 | Wuester, Sr. et al. | |
| 8,689,433 B1 | 4/2014 | Choong | |
| 8,707,531 B1 | 4/2014 | Sungkhaphong et al. | |
| 8,713,333 B1 | 4/2014 | Selvaraj | |
| 8,763,790 B1 | 7/2014 | Neamsuwan et al. | |
| 8,789,446 B1 | 7/2014 | Sungkhaphong et al. | |
| 8,803,372 B2 * | 8/2014 | Angelis | H02K 41/031 310/12.01 |
| 8,811,135 B1 | 8/2014 | Kasino et al. | |
| 2001/0048249 A1 * | 12/2001 | Tsuboi | H02K 41/031 310/12.04 |
| 2002/0092351 A1 * | 7/2002 | Horning | G01M 1/32 73/468 |
| 2002/0157241 A1 * | 10/2002 | Yamamoto | B23P 21/004 29/705 |
| 2003/0070193 A1 * | 4/2003 | Pfeiffer | B25J 17/0208 360/98.01 |
| 2004/0032170 A1 * | 2/2004 | Tamai | H02K 9/22 310/13 |
| 2005/0168086 A1 * | 8/2005 | Tamaki | F16C 29/00 310/90.5 |
| 2006/0060631 A1 * | 3/2006 | Frasch | B23K 20/004 228/4.5 |
| 2006/0125327 A1 * | 6/2006 | Sogabe | H02K 41/031 310/12.24 |
| 2006/0175907 A1 * | 8/2006 | Shikayama | H02K 41/031 310/12.25 |
| 2007/0001520 A1 * | 1/2007 | Yamazaki | H02K 41/03 310/12.29 |
| 2007/0152391 A1 * | 7/2007 | Chitayat | B23Q 1/58 269/55 |
| 2007/0282465 A1 * | 12/2007 | Shoda | G05B 13/024 700/45 |
| 2008/0084630 A1 | 4/2008 | Trongjitwikrai et al. | |

(56) References Cited

U.S. PATENT DOCUMENTS

| | | | |
|---|---|---|---|
| 2008/0196631 A1* | 8/2008 | Kosmowski | B23K 26/02 108/20 |
| 2008/0198485 A1* | 8/2008 | Kosmowski | B23K 26/0876 359/811 |
| 2009/0157848 A1 | 6/2009 | Khoo | |
| 2009/0237478 A1* | 9/2009 | Hara | B41J 11/0015 347/102 |
| 2009/0244158 A1* | 10/2009 | Hara | B41J 29/393 347/16 |
| 2009/0288281 A1* | 11/2009 | Ruden | B23Q 3/183 29/283 |
| 2010/0108256 A1 | 5/2010 | Roajanasiri et al. | |
| 2010/0114370 A1* | 5/2010 | Sasaki | B25J 9/1682 700/248 |
| 2010/0128389 A1* | 5/2010 | Chandrasekaran | G11B 25/043 360/98.08 |
| 2010/0156400 A1* | 6/2010 | Noguchi | G01D 5/145 324/207.25 |
| 2010/0297562 A1* | 11/2010 | Shibazaki | G03F 7/70691 430/325 |
| 2011/0025137 A1* | 2/2011 | Sakai | H02K 41/02 310/12.13 |
| 2011/0109252 A1* | 5/2011 | Takagi | H02K 11/215 318/135 |
| 2011/0128647 A1* | 6/2011 | Gauzner | B82Y 10/00 360/75 |
| 2011/0291496 A1* | 12/2011 | Bobelis | H02K 5/10 310/12.23 |
| 2012/0007592 A1* | 1/2012 | Manabe | G01D 5/2073 324/207.25 |
| 2013/0057986 A1 | 3/2013 | Vangal-Ramamurthy et al. | |
| 2013/0093652 A1* | 4/2013 | Kim | G09G 3/3233 345/77 |
| 2013/0248545 A1 | 9/2013 | Thongjitti et al. | |
| 2013/0249871 A1* | 9/2013 | Yoo | G06F 3/03545 345/179 |
| 2013/0282192 A1* | 10/2013 | Futami | H02P 25/06 700/287 |
| 2014/0172165 A1* | 6/2014 | Oda | G05B 19/4182 700/248 |
| 2014/0257554 A1* | 9/2014 | Takagi | H02P 25/06 700/229 |
| 2015/0171694 A1* | 6/2015 | Walsh | H02K 3/47 310/156.43 |
| 2016/0084676 A1* | 3/2016 | Moriyuki | G01D 5/2457 324/207.24 |

OTHER PUBLICATIONS

Techno INc Linear Motion Systems, "Gantry Tables", Mar. 23, 2013, pp. 2.*
Moticont, "Multi-Axis Positioning System", 2008, pp. 3.*
Gyorgi, "Scara robot screwriver HDD assembly station", Youtube.com, Aug. 3, 2014, pp. 1.*
ICPE, "Linear motors", Mar. 8, 2011, pp. 3.*
Aerotech, "ACT140DL linear motor", Jun. 8, 2012, pp. 3.*
Production machining, "inear Motor Basics", Apr. 15, 2008, http://www.productionmachining.com/articles/linear-motor-basics, pp. 4.*
Allen-Bradley, "LDL-Series Ironless Linear Servo Motors, User Manual", Mar. 2009, pp. 8.*
Allen-Bradley, "LDC-Series Iron Core Linear Servo Motors", Mar. 2011, pp. 11.*
Wikipedia, "Linear motor", Aug. 10, 2017, pp. 7.*
Wikipedia, "Electromagnetic coil", Jan. 18, 2018, pp. 5.*

* cited by examiner

MOVEABLE SLIDER FOR USE IN A DEVICE ASSEMBLY PROCESS

BACKGROUND

During the manufacturing of devices (e.g., mechanical, electromechanical, and electrical devices), an assembly device is typically utilized to connect components of the device under assembly. Due to the complexity of high-tech devices, and the cost competiveness of the high-tech industry, the components of high-tech devices need to be assembled in a precise, time effective, and cost efficient manner. Examples of high-tech devices may include: computing devices, storage devices, disk drives, personal computers, laptop computers, server computers, mobile computers, mobile devices, etc.

In particular, as to storage devices, such as, disk drives, the components of a storage device need to be assembled precisely in a very small form-factor and clean environment, as well as, in a very high speed and cost effective manner.

Satisfying the restraints of low-cost, as well as, precision and high speed assembly for devices is continuously sought after.

DETAILED DESCRIPTION

Figure 1A:
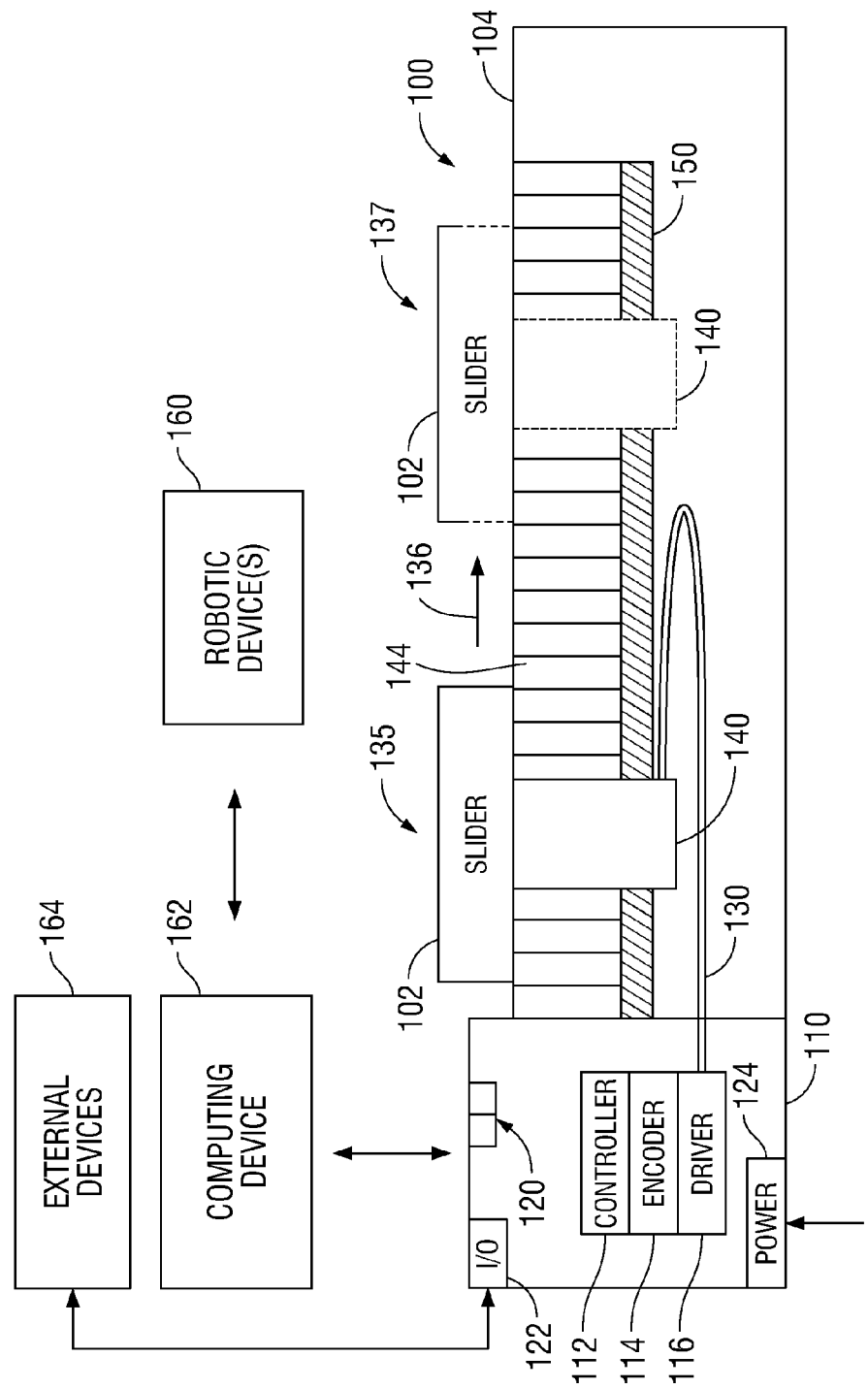
FIG. 1A is a side view of the internal components of a slider system in a device assembly system, according to one embodiment.

With reference FIG. 1A, a slider system 100 for use in a device assembly process to aid in performing at least one device assembly operation, according to one embodiment, will be hereinafter described. In one embodiment, the slider system 100 includes a moveable slider 102 that may be movably coupled to a slider base 104 such that the moveable slider 102 may move components of a device (not shown) in the assembly process of the device. An electronics module 110 coupled to the slider base 104 may also be used to control the movement of the moveable slider 102, as will be hereinafter described.

In one embodiment, electronics module 110 may include a controller 112. Controller 112 may include an encoder 114 and a driver 116. Controller 112 may also include other components. Further, electronics module 110 may include: a communications port 120; an input/output (I/O) port 122; and a power port 124 to receive power. Of course, it should be appreciated that the electronics module 110 may include other components to implement embodiments.

Driver 116 may provide driver output to the moveable slider 102. In particular, driver 116, under the control of controller 112, may transmit control signals through the driver 116 and through a cable 130 to moveable slider 102 to control the movement of moveable slider 102. As shown in FIG. 1A, the controller 112 may control the movement of the moveable slider 102 from a first position 135 to a second position 137 (in the direction of line 136) during the assembly process such that one of more device assembly operations may be performed at the first and/or second position 135 and 137. As will be described in more detail hereinafter, a device under assembly may be mounted to the moveable slider 102 of the slider system 100 and assembly operations for mounting different components of the device may be performed by a robotic device 160 at the first and/or second position 135 and 137.

Figure 1B:
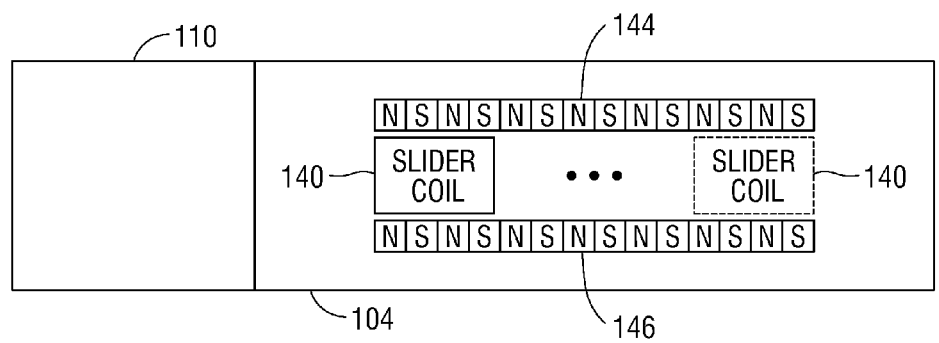
FIG. 1B is a top view of some of the components of the slider system, according to one embodiment.

As shown in FIGS. 1A and 1B, in one embodiment, the moveable slider 102 may be a magnetically controlled slider that includes a coil 140 that interacts with opposed magnets 144 and 146 that are mounted on opposed sides of the coil 140 within the slider base 104 of the slider system 100. In this embodiment, controller 112 through driver 116 and cable 130 may transmit power control signals to the coil 140 such that coil 140 is induced to move by the opposed magnets 144 and 146 from the first position 135 to second position 137. In this way, controller 112 through driver 116 and cable 130 controls a liner voice coil actuator implemented by the coil 140 and the opposed magnets 144 and 146 to move the slider 102 between the first and second positions 135 and 137. Also, in one embodiment, an encoder strip 150 may be mounted within the slider base 104 in close proximity to the magnets that may be read by the coil 140 or by another sensor of the slider 102. The encoder strip 150 provides position information of the slider 102. The position information data from the encoder strip 150 may be transmitted via cable 130 to encoder 114 of the controller 112, such encoder 114 can read the position information, and controller 112 can determine the position of slider 102. This position information can be utilized by controller 112 to ensure that slider 102 moves from the first position 135 to the second position 137 properly. Further, it should be appreciated that controller 112 may control the slider 102 for movement back and forth between the first position 135 and the second position, or between the first position 135 and the second position 137, and then on to further positions, dependent upon the assembly process to be implemented.

In another embodiment, instead of a linear voice coil actuator configuration, to move the slider 102 between the first position 135 and the second position 137, a motor controlled slider that utilizes a linear motor may be utilized. As an example, the motor controlled slider implementation may include a linear motor that is attached to the slider 102 and the slider base 104, in which, the linear motor is controlled by the controller 112. In particular, controller 112 may control the linear motor by transmitting control signals through the driver 116 and the cable 130 to provide power to the linear motor to move the motor controlled slider 102 between the first position 135 and the second position 137. Similarly, an encoder strip 150 may be utilized, as previously described, to provide position information to the controller 112.

As will be described in more detail hereinafter, one or more robotic devices 160 may perform one or more device assembly operations when slider 102 is at the first position 135 and thereafter may perform one or more device assembly operations when the slider 102 has been moved by the slider system 100 to the second location 137.

In one embodiment, a computing device 162 may communicate with the controller 112 of the electronic module 110 through communication port 120 of the electronics module to receive and transmit data from and to the controller 112. Computing device 162 may also be in communication with the robotic devices 160. For example, computing device 162 may command slider system 100 through controller 112 to stop operations if one of the robotic devices 160 fails or if a problem has occurred in the assembly process. Similarly, slider system 100 under the control of controller 112 may transmit error/problem data via communication port 120 to computing device 162 if a problem has occurred with the slider system 100. Additionally, electronics modules 110 may include an input/output (I/O) port 122 to transmit and receive data to and from other external devices 164 such as sensors, cameras, storage devices, switches, etc. It should be appreciated that the links between the communication port 120 and the computing device 162, the links between the computing device 162 and the robotic devices 160, and the links between the I/O port 122 and the external devices 164, may be wireless or wired. However, it should further be appreciated that controller 112 may control the movement of the slider 102 between the first position and the second position 135 and 137 in the assembly process independently and without a need for input from the computing device 162 and/or other external devices 164.

Figure 2:
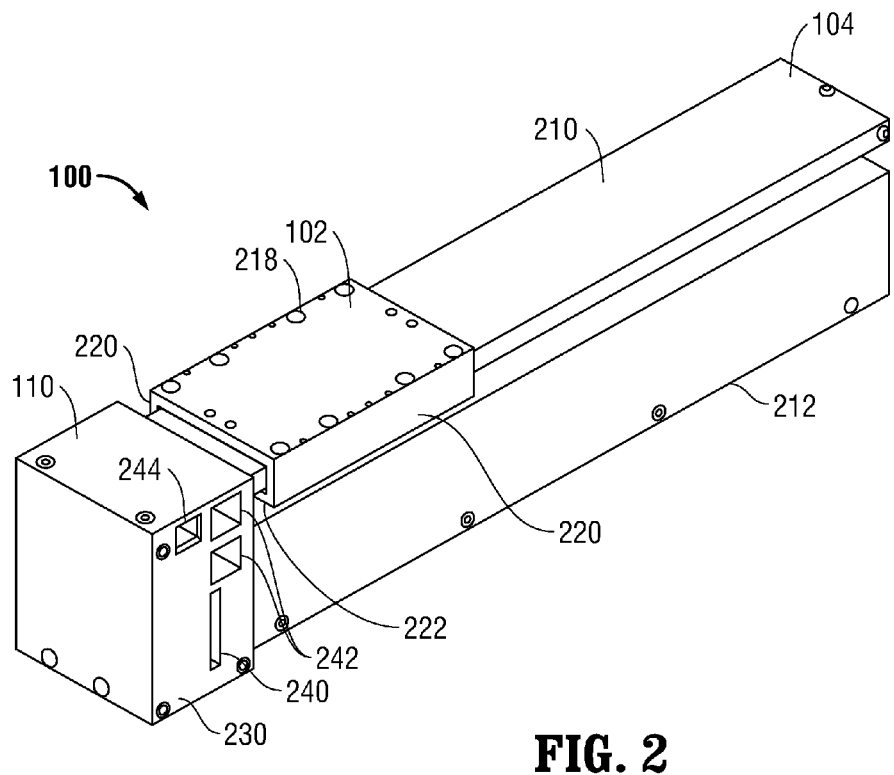
FIG. 2 is a perspective view of the slider system, according to one embodiment.

With brief additional reference to FIG. 2, a perspective view of an example of the mechanical components of the slider system 100 will be briefly described. As shown in FIG. 2, the slider system 100 may include the moveable slider 102 moveably coupled to slider base 104 in order to move components of the device (not shown) in the assembly process. In this example, the slider base 104 includes a first rectangular-shaped slider component 210 and a second rectangular-shaped slider component 212. In this example, the moveable slider 102 includes a top portion 218, two side portions 220, and a bottom portion 222. Although not particularly shown, as previously described, the slider coil 140 may extend downward from the bottom portion 222 of the slider 102 to an internal portion of the second rectangular-shaped slider component 212 of the slider base 104 where it is located between opposed magnets 144 and 146 and connected to a cable 130 (not shown) such that the controller of the electronics module 110 through the driver and the cable controls a liner voice coil actuator implemented by the coil and the opposed magnets to move the slider 102 between the first and second positions.

Further, the electronic modules 110 may be mounted to an end portion of the slider base 104 as shown in FIG. 2. The internal components of the electronics modules 110 have been previously described in detail with reference FIG. 1A. In this example, the electronics module 110 may be approximately rectangular shaped with a side 230 including various openings. As an example, there may be an opening 240 for power port 124, a pair of openings 242 for communication ports 120, and an opening 244 for I/O port 122. It should be appreciated that this is just one example of a mechanical arrangement for the slider system 100 including the slider base 104 and the electronics module 110 coupled thereto and that many different types of mechanical arrangements should be apparent to those skilled in the art.

Figure 3:
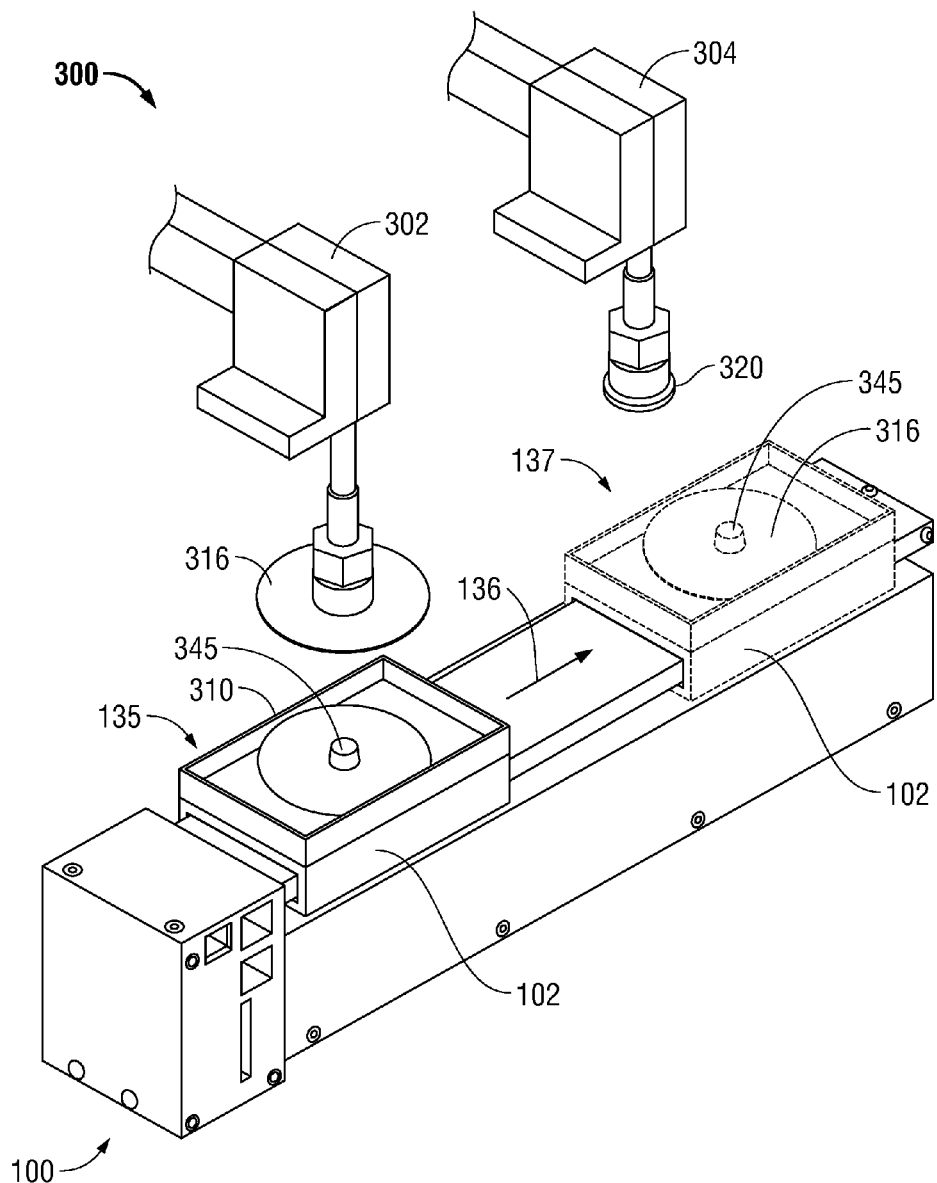
FIG. 3 is perspective view of the slider system in a device assembly system to assemble disk drive components, according to one embodiment.

With additional reference to FIG. 3, an example 300 will be illustrated in which a first and second robotic device 302 and 304 may be utilized to perform assembly operations in conjunction with the slider system 100. This example relates to the assembly of a storage device, such as, a disk drive. In this example, at first position 135, moveable slider 102 is carrying a base plate 310 having a spindle motor 345 of a disk drive under assembly to which the first robotic device 302 mounts a disk 316. Next, as previously described, the controller 112 of the slider system 100 transmits control signals through the cable 130 to the moveable slider 102 to control the movement of the slider 102 to move the movable slider 102 and the base plate 310 to the second position 137 (e.g., along line 136). At the second position 137, a second robotic device 304 mounts a spacer 320 to the spindle motor 345 as part of the assembly process of the disk drive.

It should be appreciated that the example of the disk drive assembly operation is for illustrative purposes only. It should be appreciated that the slider system 100 may be utilized in the assembly process of any device. Further, it should be appreciated that after movement to the second position 137, the moveable slider 102 and the device under assembly can be moved onto other stages of the assembly process or the device under assembly may removed and the moveable slider 102 moved back to the first position 135 such that the assembly process may be repeated.

Figure 4:
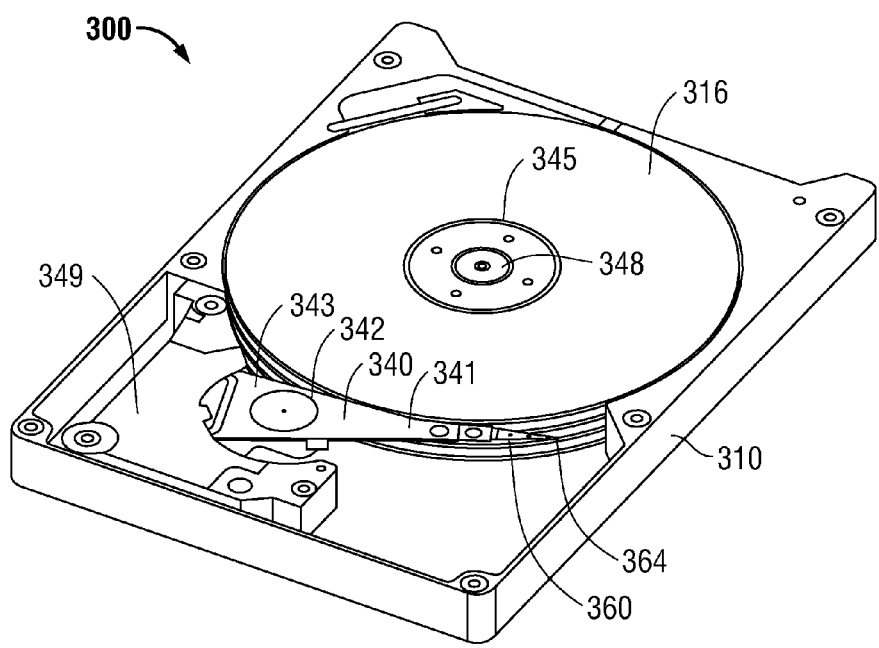
FIG. 4 is a perspective view of an example of disk drive, according to one embodiment.

With brief reference to FIG. 4 an example of a disk drive 300 is shown. Disk drive 300 may include a disk drive base 310. Multiple disks 316 may be rotatably mounted to the disk drive base 12 via spindle motor 345. A head stack assembly (HSA) 340 may be rotatably mounted to the disk drive base 12 via an actuator pivot 342. The HSA 340 may include an actuator body 343 from which a plurality of actuator arms 341 extend. At least one head gimbal assembly (HGA) 360 may be mounted to the distal end of at least one of the actuator arms 341 and each HGA 360 may include a head 364 to read and write data from and to a disk 316. The opposite end of each of the plurality of actuator arms 341 is a supported end adjoining the actuator body 343. Therefore, the disk drive 300 may comprise: a plurality of disks 46 for data storage; a spindle motor 345 for rapidly spinning each disk 346 on a spindle 348; and an HSA 340 including a voice coil motor (VCM) (beneath position 349) for moving the plurality of actuator arms 341 and heads 364 over the disks 316. The operations of disk drives are well known in the art, this illustration being merely an example.

Therefore, in one embodiment, the previously described slider system 100 may be utilized in the assembly of a storage device, such as, a disk drive 300. Examples of the type components of a disk drive that may be assembled utilizing the previously described slider system 100 may include the assembly of: disks, spacers, disk clamps, top and bottom VCM plates, crash stops, or any suitable disk drive component for the assembly of a disk drive. However, it should be appreciated that the previously-described slider system 100 may be utilized to assemble any type of mechanical, electromechanical, or electrical device.

It should be appreciated that the previously described slider system 100 may be utilized to assemble any type of small form-factor device precisely and may operate very well in a clean assembly environment. Further, the previously described slider system 100 operates at a high speed and in a cost effective manner due to its speed. In particular, the previously described slider system 100 reduces the amount of space required to complete two assembly process steps, into effectively one assembly space, and further reduces the amount of cable routing and wire management typically utilized in the assembly space. Moreover, the previously described slider system 100 may be utilized with existing assembly tools (e.g. robotics). In particular, two or more operations may be performed to assemble device components of the device at a single stage, with very high accuracy and high speed, thereby reducing assembly costs. The increase in speed, precision, and cost effectiveness is suitable for high-tech devices, such as storages devices, including disk drives.

It should be appreciated that, as has been previously described, controller 112 may be a computing device that performs operations to control the movement of the moveable slider 102 from a first position 135 to a second position 137 (in the direction of line 136) during the assembly process such that one of more device assembly operations may be performed at the first and/or second position 135 and 137. The device under assembly may mounted to the moveable slider 102 of the slider system 100 and assembly operations for mounting different components of the device may be performed by a robotic device 160 at the first and/or second position 135 and 137. As previously described, controller 112 may operate with driver 116 to transmit power control signals to a magnetically controlled slider or a motor controlled slider to perform these operations. Further, as previously described controller 112 may communicate with a computing device 162 or external devices 164 through appropriate communication ports to implement operations.

Controller 112 may operate under the control of a program or routine to execute methods or processes in accordance with the embodiments previously described. For example, such a program may be implemented as software, a software module, firmware, etc. Further, it should be appreciated that the terms controller, processor, logic, microprocessor, circuitry, controller, etc., refer to any type of logic or circuitry capable of executing logic, commands, instructions, software, software modules, firmware, functionality, etc. It should be appreciated that any type of computing device to implement the previously described functions may be utilized, such as, controllers, specialized testing computers, laptop computer, desktop computers, mobile devices, tablet computers, or any suitable computing device.

It should be appreciated by those with skill in this art that, although embodiments have been previously described with reference to an electronics module 110 with controller 112 and slider system 100, in one type of assembly environment, that embodiments may be utilized in a wide variety of different types of assembly environments utilizing various types of computers, test equipment, software, interfaces, etc.

Many implementation variations are possible. In some embodiments, the above system may be configured differently than illustrated in the figures above. For example, various functionalities provided by the illustrated components can be combined, rearranged, added, or deleted. In some embodiments, additional or different components or controllers or processors may perform some or all of the functionalities described with reference to the example embodiment illustrated in the figures above. Many implementation variations are possible.

It should be appreciated that components of the various embodiments may be implemented in hardware, software, firmware, microcode, or any combination thereof. When implemented in software, firmware, or microcode, the elements of the embodiments are the program code or code segments to perform the necessary tasks. A code segment may represent a procedure, a function, a subprogram, a program, a routine, a subroutine, a module, a software package, a class, or any combination of instructions, data structures, or program statements. The program or code segments may be stored in a controller, computer, or processor readable medium. The "controller readable or accessible medium" or "processor readable or accessible medium" or "computer readable or accessible medium" may include any medium that can store, transmit, or transfer information. Examples of the controller/processor/computer accessible medium include an electronic circuit, a semiconductor memory device, a read only memory (ROM), a flash memory, an erasable ROM (EROM), a floppy diskette, a compact disk (CD-ROM), an optical disk, a hard disk, etc. The controller/processor/computer accessible medium may include data that, when accessed by a controller/processor/computer, cause the controller/processor/computer to perform the operations previously described.

Each of the processes, methods and algorithms described in the preceding sections may be embodied in, and fully or partially automated by, code modules executed by one or more controllers, computers, processors, or machines configured to execute computer instructions. The code modules may be stored on any type of non-transitory computer-readable storage medium or tangible computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the embodiments disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

We claim:

1. A system for use in a device assembly process to aid in performing at least one device assembly operation, the system comprising:
   a slider base, the slider base comprising:
      a row of magnets;
      an encoder strip disposed along the slider base;
      a magnetically controlled slider moveably coupled to the slider base to move components of a device in the device assembly process comprising at least one device assembly operation being performed; and
      a coil disposed on the magnetically controlled slider, the coil configured to:
         inductively move the magnetically controlled slider relative to the magnets when driven with control signals from a controller, and
         read position information from the encoder strip; and
   an electronics module coupled to an end portion of the slider base, the electronics module comprising:

a driver; and the controller including the driver, the controller configured to:

transmit to the coil, through the driver and a cable directly connected between the driver and the coil, the control signals to control movement of the magnetically controlled slider, receive from the coil, through the driver and the cable, the position information; and determine a position of the magnetically controlled slider from the position information.

2. The system of claim 1, wherein the magnetically controlled slider includes a linear motor controlled slider controlled by the controller.

3. The system of claim 1, further comprising a robotic device to perform at least two device assembly operations.

4. The system of claim 3, wherein the at least two device assembly operations performed by the robotic device include mounting a disk to a spindle motor and mounting a spacer to the disk.

5. A method for a device assembly process to perform at least one device assembly operation, the method comprising:

moving a magnetically controlled slider coupled to a slider base to move components of the device in the assembly process, the slider base comprising:

two rows of magnets;

an encoder strip disposed along the slider base; and a coil disposed on the magnetically controlled slider, the coil configured to:

inductively move the magnetically controlled slider relative to the magnets when driven with control signals from a controller, and read position information from the encoder strip;

wherein a driver of the controller connects, via a cable, with the coil to transmit control signals and thereby to control movement of the magnetically controlled slider, wherein the cable extends within the slider base and the magnetically controlled slider moves components of a device in the device assembly process in which at least one device assembly operation is performed;

transmitting, with the controller and to the coil through the driver and the cable directly connected between the driver and the con, the control signals to control movement of the magnetically controlled slider, receiving, with the controller and from the coil through the driver and the cable, the position information; and determining, with the controller, a position of the magnetically controlled slider from the position information.

6. The method of claim 5, wherein the magnetically controlled slider includes a linear motor controlled slider.

7. The method of claim 5, further comprising receiving and transmitting data from and to a computing device.

8. The method of claim 5, wherein a robotic device performs at least two device assembly operations.

9. The method of claim 8, wherein the at least two device assembly operations performed by the robotic device include mounting a disk to a spindle motor and mounting a spacer to the disk.

10. A non-transitory computer-readable medium having one or more instructions stored thereon to control moving a magnetically controlled slider coupled to a slider base comprising two rows of magnets and an encoder strip disposed along the slider base to aid in performing at least one device assembly operation in a device assembly process, the one or more instructions executable by an electronics module coupled to an end portion of the slider base to implement functions including:

moving the magnetically controlled slider coupled to the slider base to move components of the device in the assembly process, the magnetically controlled slider being moveable between the rows of magnets;

wherein a driver of a controller connects, via a cable, with a coil disposed on the magnetically controlled slider to transmit control signals and thereby to control movement of the magnetically controlled slider, wherein the cable extends within the slider base and the magnetically controlled slider moves components of the device in the assembly process in which at least one device assembly operation is performed, wherein the coil is configured to inductively move the magnetically controlled slider relative to the magnets when driven with control signals from the controller and read position information from the encoder strip;

transmitting, with the controller and to the coil through the driver and the cable directly connected between the driver and the coil, the control signals to control movement of the magnetically controlled slider, receiving, with the controller and from the coil through the driver and the cable, the position information; and determining with the controller a position of the magnetically controlled slider from the position information.

11. The non-transitory computer-readable medium of claim 10, wherein the magnetically controlled slider includes a linear motor controlled slider.

12. The non-transitory computer-readable medium of claim 10, further comprising instructions to implement functions including receiving and transmitting data from and to a computing device.

13. The non-transitory computer-readable medium of claim 10, wherein, a robotic device performs the at least two device assembly operations.

14. The non-transitory computer-readable medium of claim 13, wherein the at least two device assembly operations performed by the robotic device include mounting a disk to a spindle motor and mounting a spacer to the disk.

* * * * *